US007886225B2

(12) United States Patent
Cope

(10) Patent No.: US 7,886,225 B2
(45) Date of Patent: Feb. 8, 2011

(54) METHOD AND APPARATUS FOR THE CREATION, LOCATION AND FORMATTING OF DIGITAL CONTENT

(75) Inventor: Bill Cope, Altona (AU)

(73) Assignee: Common Ground Publishing Pty. Ltd., Victoria (AU)

( * ) Notice: Subject to any disclaimer, the term of this patent is extended or adjusted under 35 U.S.C. 154(b) by 960 days.

(21) Appl. No.: 10/562,044

(22) PCT Filed: Jun. 28, 2004

(86) PCT No.: PCT/AU2004/000857

§ 371 (c)(1),
(2), (4) Date: Jan. 25, 2007

(87) PCT Pub. No.: WO2005/001708

PCT Pub. Date: Jan. 6, 2005

(65) Prior Publication Data

US 2007/0162465 A1    Jul. 12, 2007

(30) Foreign Application Priority Data

Jun. 27, 2003    (AU) ............................... 2003903306

(51) Int. Cl.
G06F 17/00    (2006.01)
(52) U.S. Cl. ..................... 715/239; 715/835; 715/231
(58) Field of Classification Search .................. 715/205, 715/230–239, 764; 707/3–6, 102
See application file for complete search history.

(56) References Cited

U.S. PATENT DOCUMENTS

2003/0088543 A1* 5/2003 Skeen et al. .................... 707/1
2003/0167445 A1* 9/2003 Su et al. ...................... 715/513

FOREIGN PATENT DOCUMENTS

CA    2223953    6/1999
CA    2411459    5/2003

* cited by examiner

Primary Examiner—Doug Hutton
Assistant Examiner—Quoc A Tran
(74) Attorney, Agent, or Firm—Allen Dyer Doppelt Milbrath & Gilchrist

(57) ABSTRACT

A system of translating a first schema of data having one structure or semantics into a second schema of data having a second structure or semantics by using a computer-implemented ontology deconstruction and reconstruction transfer mechanism which automatically creates an 'interlanguage' document type definition (interlanguage DTD) in which the interlanguage DTD automatically manages the structure and semantics of the structure and semantics of data to allow an automatic interlanguage definition of the first schema and translation into the second schema by the transfer mechanism. Such use can be in the publishing industry to translate data from any one of a number of key XML-based schemas such as DocBook, HTML4, Open eBook, Digital Talking Book, ONIX, MARC, etc to another of such schemas. The system can also be used to translate queries made on documents in the interlanguage DTD as queries on any of the schemas mapped to that interlanguage DTD.

21 Claims, 10 Drawing Sheets

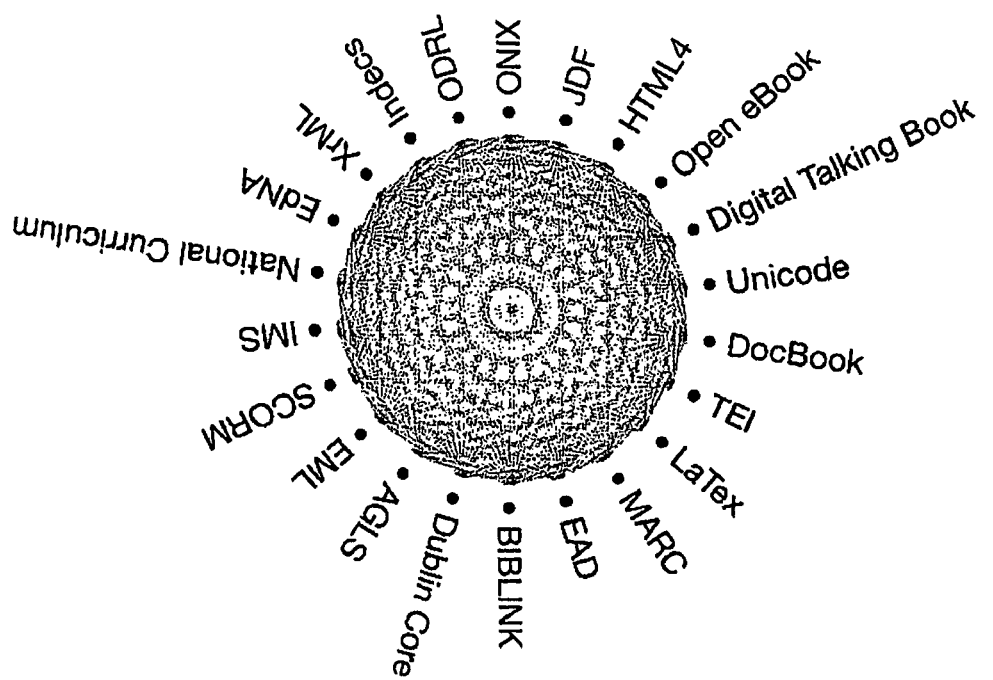
FIG. 1: The Crosswalks Dilemma Illustrated—17 Ontologies Require 272 Crosswalks FIG. 2: The Indefinitely Extensible Interlanguage Mechanism—Common Ground Markup Language (CGML) as an example.

FIG. 3: Using the Interlanguage Mechanism, the Number of Mappings Equals the Number of Mapped Schemas (in this case n = 17)
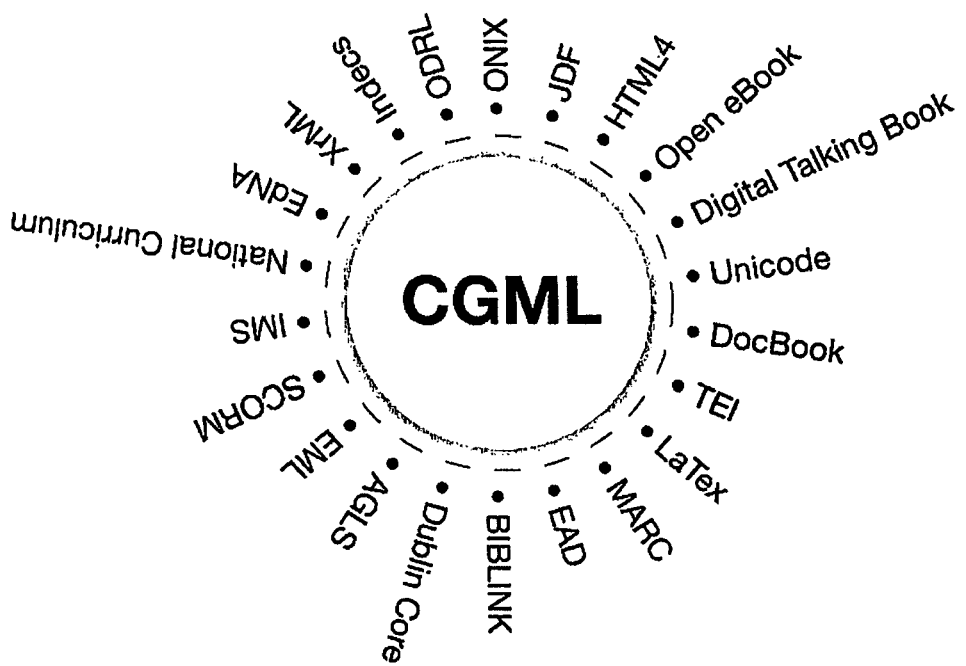

FIG. 4: The method of operation of the Interlanguage apparatus.
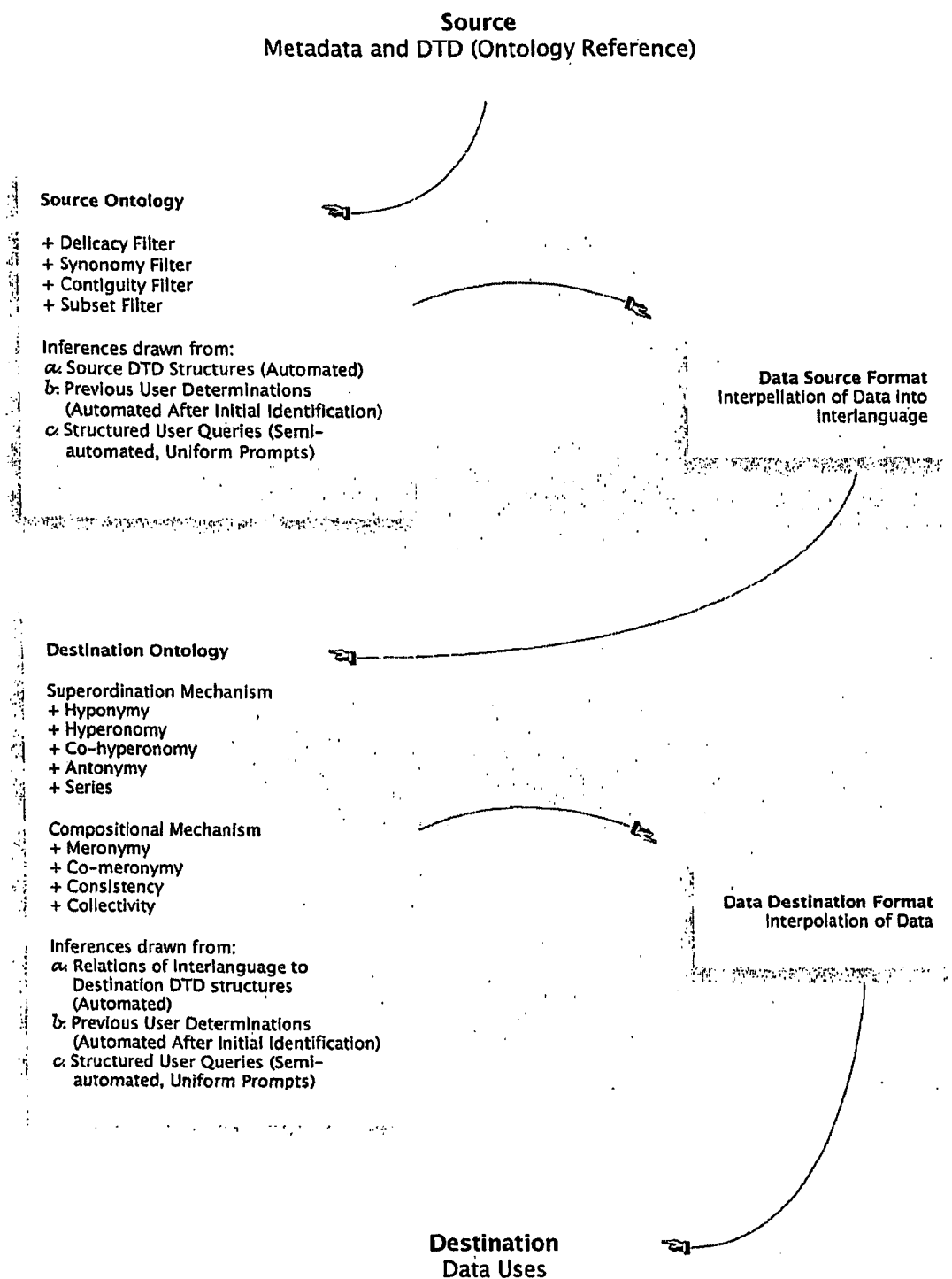

FIG. 5: Ontology-Building Apparatus—CGLexicographer.

| Properties | Field | View | Comments | Undo | Secur |

♀ Ontology Term at Zope → Intranet → CGOntology → CGCountryOfPublication

Structure Properties

- Tag-Concept: Country Of Publication
- Dictionary Definition: The country in which a <ref id="CGPublisher"/> or an <ref id="CGImprint"/> officially publishes a particular <ref id="CGProduct"/>.
- Description:
- Children:
  - CG35mmSlideProjector
  - CGAGLS
  - CGASPContractsDelegation
  - CGAbbreviatedTitle
  - CGAbbreviation
  - CGAbbreviationList
  - CGAbridgedVersionOf
- Schema Synonyms: ONIX<CountryOfPublication> MARC<008,044$c>
- Data Type:
- Is a field? ☑

[Save Changes]

FIG. 6: Data entry area in CGPublisher (formerly named the Creator-to-Consumer (C-2-C) System. Using the invention, data can be exported into multiple ontologies.
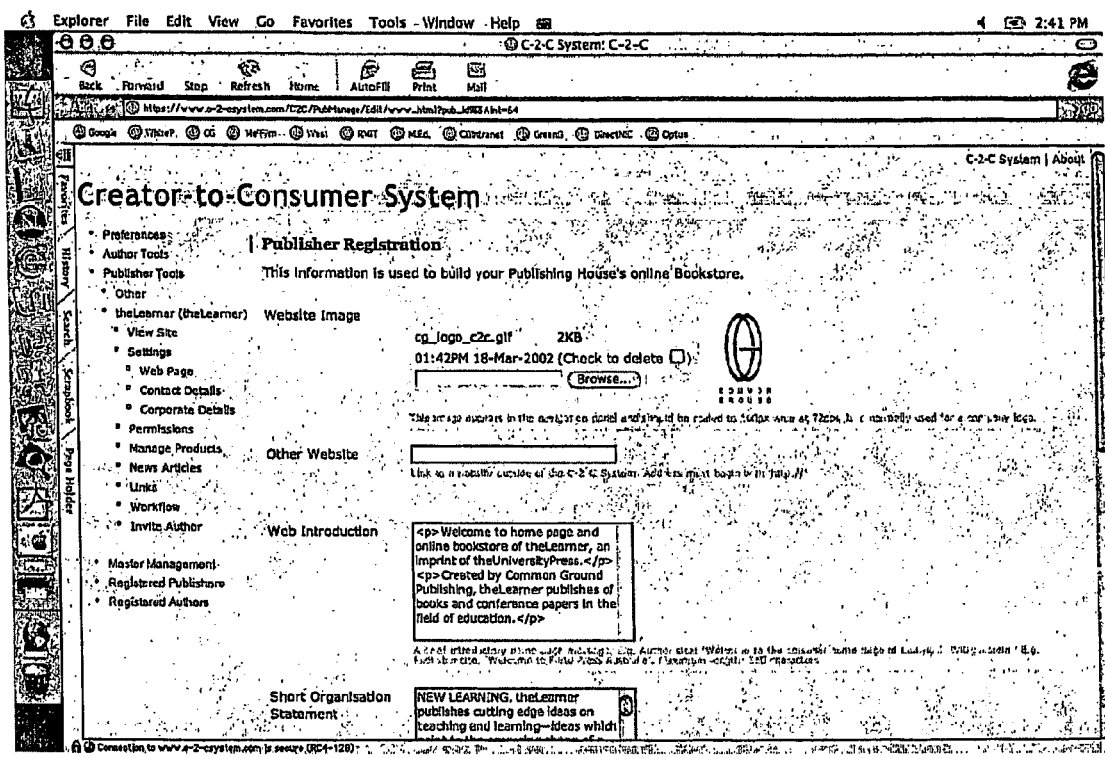

FIG. 7A: Example of Taxonomic Representation of Tags Relations in overlapping Ontologies, as Generated by the Invention with First to Fourth Order Concepts
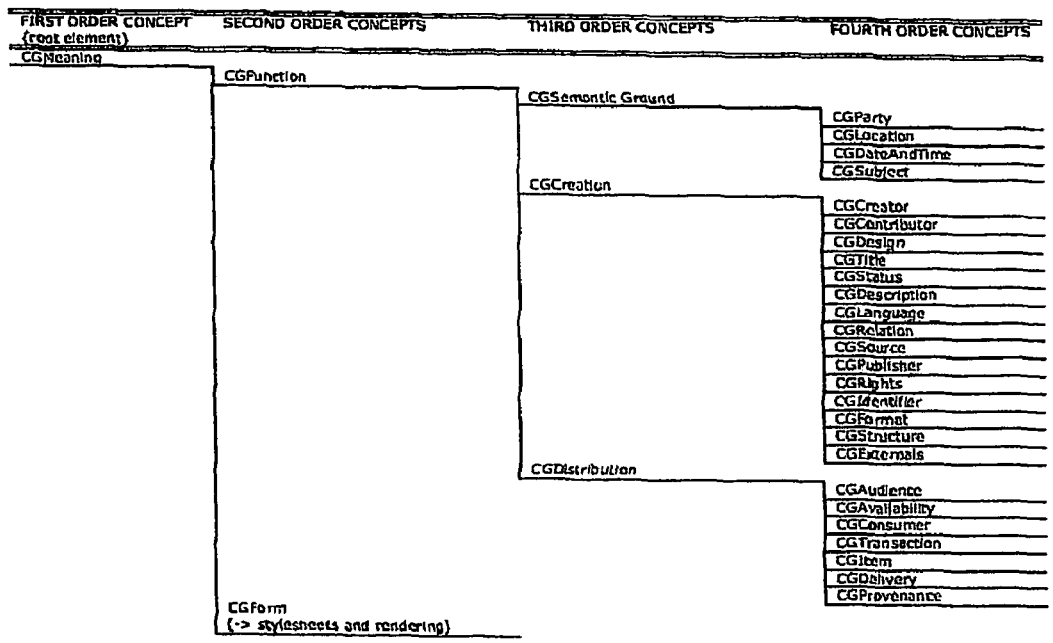

FIG. 7B: Example of Taxonomic Representation of Tags Relations in overlapping Ontologies, as Generated by the Invention with Fourth to Sixth Order Concepts

| FOURTH ORDER CONCEPTS | FIFTH ORDER CONCEPTS | SIXTH ORDER CONCEPTS |
|---|---|---|
| CGParty<br>XrML<principal><br>IN<party><br>SCORM<centity> | | |
| | CGPerson<br>IMS<person><br>ONIX<Name><br>XrML<commonName><br>IN<person><br>EAD<persname><br>MARC<100/700 I1 = 1; I2 = # ;<br>$a,600 I1 = 1; I2 = 4; $a > | |
| | | CGNameFunction<br>CGNameforPublication<br>CGLegalName<br>CGMainName |
| | | CGHonorific<br>ONIX<TitlesBeforeNames><br>DB<honorific><br>MARC<100/700 I1 = 1; I2 = # ; $a;<br>$c,600 I1 = 1; I2 = 4; $c > |
| | | CGGivenNames<br>ONIX<NamesBeforeKey><br>DB<firstName>,DB<othername><br>MARC<100/700 I1 = 1; I2 = # ;<br>$a,600 I1 = 1; I2 = 4; $a ><br>EML<Initials-prefix> |
| | | CGSurnamePrefix<br>ONIX <PrefixToKey> |
| | | CGSurname<br>ONIX<KeyNames><br>DB<surname><br>EAD<famname><br>MARC<100/700 I1 = 1; I2 = # ; $a;<br>$b,600 I1 = 1; I2 = 4; $a> |
| | V (to CGOrganisation) | CGNameSuffix<br>ONIX<SuffixToKey><br>DB<lineage> |

FIGURE 8 shows a fragment of the Dublin Core to CGML Thesaurus.

FIGURE 9 shows a fragment of the CGML Dictionary of Authorship and Publishing specifying the concepts of <Creation> and <Creator>.

| NOTATION Tag-Concept. | DEFINITION Dictionary definition based on parent concepts. | ANNOTATION Examples, related child concepts, data entry advice. |
|---|---|---|
| CGCreation | The process of realising Meanings which serve particular communicative or representational Functions. | Involves Creators and Contributors, developing a Design, which is expressed as a Work and is manifest in the form of a Product, Event or Service. A Design has a Title and may vary in Status (as it evolves, for instance, from Proposal, to Draft, to Edition). It may have a Description which summarises or overviews its content. In the case of text, it will be expressed in a particular Language. It may sit in a defined Relation to other Designs, Works or Products, and this may be specified as a Source. Distribution may be the responsibility of a Publisher, on the basis of an assignment or licensing of Rights. It may have an Identifier in the form of a unique string of numbers and/or letters such as an ISBN or a URL. It will have a Format and an Inherent and characteristic Structure, and also possibly Externals which exist specifically in order to relate to the Work, for example by way of Review or Promotional Matter. |
| CGCreator | A Person who, or an Organisation which, plays a primary role in the conceptualisation of a creative Design and the execution of a Work. An essential Party to the process of Creation. | Includes the roles of Author, Editor, Scriptwriter, Lyricist, Composer, Visual Artist, Photographer and Conference Presenter. |

METHOD AND APPARATUS FOR THE CREATION, LOCATION AND FORMATTING OF DIGITAL CONTENT

FIELD OF THE INVENTION

The present invention pertains to a method and an apparatus for extending the range of useability of ontology driven systems beyond the scope of the original design of each, and for creating interoperability between different mark-up schemas for the location and formatting of digital content. In particular the invention relates to method and apparatus for the creation, location and formatting of digital content.

BACKGROUND ART

A key background of the invention is the emergence of the Internet and the World Wide Web as widespread information and communications technology in the mid 1990s, and more recently in 1998, the invention of Extensible Mark-up Language (XML). Both the web and XML are derivatives of a much older computer technology, Standardised General Mark-up Language (SGML), which originated in the IBM laboratories in the early 1970s as a framework for the documentation of technical text, such as computer manuals. In the late 1980s, Tim Berners-Lee began working on a vastly simplified version of SGML, which was to become the heart of the World Wide Web: HyperText Mark-up Language (HTML). The key deficiency of HTML (progressively removed by version 4 of HTML) was that it was somewhat of a conceptual jumble, mixing historical typesetting tags (presentational concepts) with structural and semantic tags.

The widespread and increasing use of XML, reflects an enormous conceptual leap in data and document definition, in two regards. First, XML is not a mark-up language, but a mark-up language for mark-up languages—a place where, in other words, any mark-up language could be created. Second, XML rigorously separates mark-up for structure and semantics from presentation—which occurs independently in a 'stylesheet transformation' area. The great benefit of the XML approach is that content can be 'multi-purposed' by means of different stylesheet transformations. A page of text, for example, can be rendered as a web page, or a printed page, or as an image on a portable reading device, or as synthesised voice. This level of flexibility functions perfectly well when multiple stylesheets are applied to a document formed within a single XML schema, as embodied in a Document Type Definition (DTD). The key problem addressed by this invention is the integration of data created within multiple and varied DTDs.

XML creates the conditions of interoperability in two important regards: first, it allows alternative stylesheet transformations which may cross rendering platforms (print, screen, audio etc.); and second, it provides a universal platform for the creation of Document Type, Definitions. The former interoperability is limited insofar as the claimed flexibility is restricted to a single DTD. The latter operates at such a high level of generality that it provides no practical or workable basis for DTD-to-DTD interoperability. It is this latter mechanism which has been created by the invention described here.

XML has become ubiquitous. Alongside this ubiquity, however, has been the burgeoning of varied and functional overlapping schemas, some of which are regarded as industry 'standards', some of which are commercial. However, the functional overlap has not been produced functional interoperability, as is the case with this invention.

To take the example of the publishing industry, a number of key XML-based schemas have emerged, with an enormous amount of functional overlap, but without any real possibility of achieving interoperability given the current state of the art. Major areas include:

a) Document formation (DocBook, Text Encoding Initiative);
b) Electronic content creation (HTML and XHTML and their derivatives such as Open eBook and Digital Talking Book)
c) Print rendering (Job Definition Format);
d) B-2-B e-commerce (ONIX, or the Online Information Exchange standard for publishers and booksellers);
e) Library cataloguing (principally the Library of Congress MARC, MODS and METS standards);
f) Digital Rights Management (Extensible Digital Rights Management Language and the MPEG21 Rights Data Dictionary);
g) Internet syndication and resource discovery (Dublin Core, RSS, Atom);
h) E-learning (the Shareable Content Object Reference Model and the Instructional Management Systems standards).

These standards are an example of what is now called the 'semantic web'. Each XML schema is an 'ontology' consisting of a content tagging schema which describes the scope of a particular software application. These are the basis either of Document Type Definitions (or DTDs in XML file format) or database structures (which can, in turn produce exports into XML files based on the database structure). Tim Berners-Lee predicts that this is the next great step in the development of the internet, and one which promises more accurate resource discovery, machine translation and eventually, artificial intelligence.

There is one great barrier to this vision, and that is the problem of interoperability. Even though each standard or XML DTD has its own functional purpose, there is a remarkable amount of overlap between these standards. The overlap, however, often involves the use of tags in mutually incompatible ways. Our extensive preliminary R&D investigating the approximately twenty major standards that apply in just one industry—the publishing industry—shows that, on average, each standard shares seventy percent of its semantic range with neighbouring standards. Despite this, it is simply not possible to transfer data from one standard to another as each standard has been designed as its own independent, stand alone DTD. This, in fact, points to one of the key deficiencies of XML as a meta-mark-up framework: it does not provide a way for DTDs to relate to each other. In fact, its very openness invites a proliferation of DTDs, and with this proliferation, the problem of interoperability compounds itself.

This produces a practical, commercial problem. In the book publishing and manufacturing supply chain, for instance, different links in the chain use different standards: typesetters, publishers (internet, e-book and print), booksellers, printers, manufacturers of electronic rendering devices and librarians. This disrupts the digital file flow, hindering supply chain integration and the possibilities of automating key aspects of supply chain, manufacturing and distribution processes. Precisely the same practical problems of interoperability are now arising in other areas of the electronic commerce environment.

A task in today's IT world involves sharing data between systems. XML has emerged as the so-called 'syntactic sugar' to facilitate this task. As an example, Company A may have a commercial obligation to provide Company B with metadata about a series of documents, such as their titles, authors, classificatory categories and ISBNs. Both parties must agree on a common DTD to allow this to happen, which may be devised by the parties or based on an existing standard. In addition, each party must map their internal systems to this common DTD. Finally a further set of information—security constraints, transactional characteristics, network protocols and messaging conditions (whether responses must be synchronous or asynchronous)—must be agreed to before the metadata can be transferred. This complexity arises in the relatively simple transfer of information between two conferring parties.

However, in a scenario where there are many more than two parties, where the information is not covered by a single standard, where the resources and skills of the parties cannot facilitate costly and time-consuming integration, a different approach is needed—one which caters for the complexity of the messages, while providing tools which simplify the provision and extraction of metadata. This approach is one which has been termed semantic and structural interoperability. It involves providing a systematic mapping of associated XML standards to a common XML 'mesh', which must track semantic overlays and gaps, schema versioning, namespace resolution, language and encoding variances, and which must provide a comprehensive set of rules covering the data transfer—such as security, transactional and messaging issues.

The idea of a 'meta-schema'—a schema to cover other related schemas—was initially considered to be sufficient. Research has demonstrated, however, that this is not enough, being subject to many of the same problems as the individual schemas being mapped—versioning, terminological differences and so on.

Mark-up ontologies or software tagging systems use a variety of encoding formats, including Extensible Mark-up Language (XML) and Resource Definition Framework (RDF). Ontologies promise to overcome two of the most serious limitations of the World Wide Web:

1. the fact that search algorithms primarily locate semantically undifferentiated strings of characters; and 2. the fact that rendering alternatives are mostly limited by data entry methods—printed web pages do not live up to the historical standards of design and readability of printed text, and alternative non-visual renderings, such as digital talking books are at best poor.

Specific ontologies are designed to provide more accurate search results than is the case with computer or web-based search engines. Examples include the Dublin Core Metadata Framework and MARC electronic library cataloguing system. However, metadata harvested in one scheme cannot be readily or effectively be used in another.

Specific ontologies are also designed for a particular rendering option. For instance, amongst ontologies describing the structure of textual content, HTML is designed for use in web browsers, DocBook for the production of printed books, Open eBook for rendering to hand held reading devices and Digital Talking Book for voice synthesis. Very limited interoperability is available between these different ontologies for the structure of textual data, and only then if it has been designed into the ontology and its associated presentational stylesheets.

Furthermore, it is not practically possible to harvest accurate metadata from data, as data structuring ontologies and ontologies for metadata are mutually exclusive. The field of the semantic web attempts to improve the inherent deficiencies in current digital technologies both in the area of resource discovery (metadata-based search functions) and rendering (defining structure and semantics in order to be able to support, via stylesheet transformations, alternative rendering options).

Its success, however, has been very limited, primarily because of the semantic dissimilarities between overlapping ontologies and because of the limited rendering options catered for in ontologies which define data structure. At most, one-to-one, schema-to-schema 'crosswalks' have been created.

Creating a single crosswalk is a large and complex task. As a consequence, the sheer number of significant overlapping ontologies in a domain presents a barrier to achieving interoperability. For instance, our research has identified more than twenty major ontologies pertaining to the domain of authorship and publishing. Using the 'crosswalk' approach, every tag in a schema needs to be mapped tag by tag against every tag in every other schema with which interoperability is required.

Each crosswalk in fact involves two translations: Ontology A defined tag by tag in terms of Ontology B, and Ontology B defined tag by tag in terms of Ontology A. Using the crosswalk method, the number of mappings to achieve interoperability between N tagging schemas is $2\{(N/2)(N-1)\}$. In a terrain encompassing twenty-ond ontologies, for instance, 420 crosswalks would be required (see FIG. 1). Moreover, new ontologies are regularly emerging and each new ontology increases exponentially the scale of the task of achieving interoperability.

The present invention addresses fundamental problems that currently arise in the area of interoperability of data and metadata. These can be summarised as follows:

1. The failure of 'the semantic web' to improve the search mechanisms of computers and the Internet across even similar domains of knowledge, information and data. As a consequence, searching still functions primarily on the basis of a semantically and structurally agnostic process of matching of strings of characters.

2. There is limited interoperability between ontologies for metadata tagging, and when there is, it is a consequence of the laborious manual crosswalks approach.

3. There is a limited range of rendering options, even when mark-up for structure and semantics is separated from the rendering apparatus of the stylesheet.

SUMMARY OF THE INVENTION

The invention provides a method of translating a first schema of data having one structure or semantics into a second schema of data having a second structure or semantics by using an ontology deconstruction and reconstruction transfer mechanism which creates an 'interlanguage' document type definition (interlanguage DTD) in which the interlanguage DTD manages the structure and semantics of the structure and semantics of data to allow an interlanguage definition of the first schema and translation into the second schema by the transfer mechanism.

The deconstruction and reconstruction transfer mechanism includes: machine-reading tags; interpreting the data format which has been marked up by these tags and detecting its inherent structures or semantics to be included in the interlanguage DTD; and using the interlanguage DTD to transfer the data of the first schema into the second schema.

The transfer mechanism uses at least two overarching mechanisms including a superordination mechanism and a composition mechanism in which the superordination mechanism constructs tag-to-tag 'is a . . . ' relationships and the composition mechanism constructs tag-to-tag 'has a . . . ' relationships.

The superordination mechanism has any one or more of the submechanisms of hyponymy ('includes in its class . . . '), hyperonymy ('is a class of . . . '), co-hyperonomy ('is the same as . . . '), antonymy ('is the converse of . . . ') and series ('is related by gradable opposition to . . . ').

The composition mechanism has any one or more of the submechanisms of meronymy ('is a part of . . . '), co-meronymy ('is integrally related to but exclusive of . . . '), consistency ('is made of . . . '), collectivity ('consists of . . . ').

In use data is imported, and in which supplementary tag-by-tag or field-by-field relationships are generated using one or more of the filter mechanisms of:

1. taxonomic distance (determining whether the relationships of composition and superordination are too distant to be necessarily valid),
2. levels of delicacy (determining whether an aggregated data element needs to be disaggregated and re-tagged),
3. potential semantic incursion (determining identifiable sites of ambiguity), and
4. translation of silent into active tags or vice versa (determining the level in the hierarchy of composition or superordination at which data needs to be entered to effect superordinate transformations).

Also the invention provides a system of translating a first schema of data having one structure or semantics into a second schema of data having a second structure or semantics by using a computer-implemented ontology deconstruction and reconstruction transfer mechanism which automatically creates an 'interlanguage' document type definition (interlanguage DTD) in which the interlanguage DTD automatically manages the structure and semantics of the structure and semantics of data to allow an automatic interlanguage definition of the first schema and translation into the second schema by the transfer mechanism.

The deconstruction and reconstruction transfer mechanism can include providing an apparatus able to: machine-read tags automatically; interpret the data format which has been marked up by the tags and detect its inherent structures or semantics; and transfer this data into the second schema via automatic interlanguage DTD definition of the first schema into the second schema.

The transfer mechanism uses overarching mechanisms including a superordination mechanism and a composition mechanism in which the superordination mechanism automatically constructs tag-to-tag 'is a . . . ' relationships and the composition mechanism automatically constructs tag-to-tag 'has a . . . ' relationships.

Data is imported in a substantially automated way to as great a degree as is feasible given the parameters of the interlanguage DTD and what can be machine-read from exemplifying data, and in which supplementary tag-by-tag or field-by-field queries are automatically generated according to any one or more of the above described filter mechanisms.

Further the invention provides a system of providing an apparatus which interpellates source data into an interlanguage DTD format for use in transferring data marked up in a first schema of data having one structure or semantics into a second schema of data having a second structure or semantics including one or more of the following steps:

a. providing a quantum of source data of said first schema to a processing and storing apparatus;
b. machine-reading the said source data into an DTD according to a schematic structure of a particular source ontology;
c. automatically reading the structure and semantics ontology immanent in the source data by interpreting this both from the DTD and the way the DTD is realised in that particular instance;
d. applying one or more of the four filters: a delicacy filter, a synonomy filter, a contiguity filter and a subset filter;
e. machine-reading determining from the DTD and its particular instantiation an inherent taxonomic or schematic structure forming the interlanguage DTD comprising of relationships of tags that are unambiguous based on the readable structure of the DTD and evidence drawn from its instantiation in the source data.
f. providing a structured query for assessment of ambiguous relationships of tags and receiving an assessed response to the structured query to add to the interlanguage DTD.
g. drawing implications from the assessed response to the structured query to become part of the memory of the apparatus, for aiding in automatically reading the structure and semantics ontology immanent in the source data.
h. using the determined interlanguage DTD to build a destination dataset using the mechanisms of superordination (hyponymy, hyperonymy, co-hyperonomy, antonymy and series) and composition (meronymy, co-meronymy, consistency, collectivity).
i. building a destination data is automated according to the inherent structures readable into the destination ontology or from any previous received assessments of ambiguous structures.

The invention further provides an apparatus for translating a first schema of data having one structure or semantics into a second schema of data having a second structure or semantics by using a computer-implemented ontology deconstruction and reconstruction transfer mechanism which automatically creates an 'interlanguage' document type definition (interlanguage DTD) in which the interlanguage DTD automatically manages the structure and semantics of the structure and semantics of data to allow an automatic interlanguage definition of the first schema and translation into the second schema by the transfer mechanism; the apparatus having: a tag reader for machine-reading tags automatically; an interpreter for interpreting of data format which has been marked up by the tags and detecting its inherent structures or semantics; translator for automatically constructing an interlanguage DTD from the interpreted data format and detected structures or semantics; and a transfer means for automatically transferring the data of first schema into the second schema via automatic definition of the first schema into the second schema using the interlanguage DTD.

The interpreter uses the transfer mechanism having at least two overarching mechanisms.

The overarching mechanism includes a superordination mechanism and a composition mechanism in which the superordination mechanism automatically constructs tag-to-tag 'is a . . . ' relationships and the composition mechanism automatically constructs tag-to-tag 'has a . . . ' relationships.

In the superordination mechanism, there are any one or more of the sub-mechanisms of hyponymy ('includes in its class . . . '), hyperonymy ('is a class of . . . '), co-hyperonomy ('is the same as . . . '), antonymy ('is the converse of . . . ') and series ('is related by gradable opposition to . . . ').

Within the composition mechanism, there are any one or more of the sub-mechanisms of meronymy ('is a part of . . . '), co-meronymy ('is integrally related to but exclusive of . . . '), consistency ('is made of . . . '), collectivity ('consists of . . . ').

Supplementary tag-by-tag or field-by-field queries are automatically generated according to any one or more of the previously described filter mechanisms of taxonomic distance, levels of delicacy, potential semantic incursion, translation of silent into active tags or vice versa.

A computer readable medium having a program for translating a first schema of data having one structure or semantics into a second schema of data having a second structure or semantics by using a computer-implemented ontology deconstruction and reconstruction transfer mechanism which automatically creates an 'interlanguage' document type definition (interlanguage DTD) in which the interlanguage DTD automatically manages the structure and semantics of the structure and semantics of data to allow an automatic interlanguage definition of the first schema and translation into the second schema by the transfer mechanism.

The invention involves a system and an apparatus for extending the use of extant ontology driven software and digital file mark-up schemas into overlapping domains, such as XML-instantiated ontologies. Our invention arises from the technical and commercial logistics of structuring and rendering text, digital resource discovery, library cataloguing, e-commerce, digital rights management and e-learning.

However, the method and apparatus of our invention is applicable to any other contexts demanding interoperability of tagged data. In application, the apparatus creates functionalities for data framed within the paradigm of one schema which extend well beyond those originally conceived by that schema. The invention creates interoperability between schemas, allowing data originally designed for use in one schema for a particular set of purposes to be used in another schema for a different set of purposes.

Also in accordance with the invention there is provided a method and apparatus for extending the range of useability of ontology driven systems and for creating interoperability between different mark-up schemas for the creation, location and formatting of digital content, the method includes the steps of:
  a) having a database or datafile of digital content in a Document Type Definition of the first digital mark-up or computer software ontology able to be outputted in a selected format allowed by the first digital mark-up or computer software ontology;
  b) organising digital mark-up or computer software tags of the first digital mark-up or computer software ontology into an overarching interlanguage ontology capable of absorbing and incorporating at least one other digital mark-up or computer software ontology;
  c) automatically translating a Document Type Definition of the first digital mark-up or computer software ontology into a translated interlanguage Document Type Definition;
  d) selecting one of the at least one other digital mark-up or computer software ontology;
  e) automatically translating the translated interlanguage Document Type Definition into a Document Type Definition of the selected other digital mark-up or computer software ontology thereby allowing information in the database or datafile format to be outputted in the required selected format allowed by the selected other digital mark-up or computer software ontology.

The step of organising digital mark-up or computer software tags of the first digital mark-up or computer software ontology into an overarching interlanguage ontology capable of absorbing and incorporating at least one other digital mark-up or computer software ontology includes the steps of indexing according to the following rules:

(i) providing a first level of granularity such that tags which represent data at a finer level of delicacy in Ontology X produce automatically recomposed data in Ontology Y which manages the same data at a higher level of semantic aggregation.
  (ii) providing a lowest common denominator semantics such that, when data has been data marked up with a pair of tags that can be interpreted to be closely synonymous but not identical, the narrower semantics of the two tags is operationalised.
  (iii) providing contiguous domains wherein tags can be aggregated and aligned by virtue of the fact that they relate to semantically exclusive data.
  (iv) providing subset schemas within a tag such that a whole new domain identified by within Ontology Q or within a defined area of ontology Q can be mapped within a single tag in Ontology R.

The Mark-up Language of one embodiment of the invention is called Common Ground Markup Language (CGML) is a unique kind of DTD. In fact, although it is technically a DTD, it is a DTD of a fundamentally different order to any other. It does not have an independent life as a DTD. Rather, it is a uniquely designed and constructed apparatus whose semantic life is derived solely from other DTDs and whose operational realisation is found within other DTDs: This adds another fundamental layer to the bifurcation of DTDs representing structure and semantics and DTDs representing rendering or presentational alternatives (stylesheets). The interlanguage apparatus is a DTD which does not manage structure and semantics per se; rather it automatically manages the structure and semantics of structure and semantics. Its mechanism, in other words, is meta-structural and meta-semantic. We have named its underlying mechanism the 'interlanguage' DTD or in one embodiment of the invention the CGML. Although developed in the case of one particular instantiation of the problem of interoperability—for the electronic standards that apply to the publishing supply chain—the core technology is applicable to the more general problem of interoperability characterised by the semantic web and electronic commerce more generally.

Filtering standards that don't functionally interoperate, by passing them through the 'interlanguage' mechanism for database and document tagging which forms a core part of the invention, the method and apparatus creates functional interoperability between unrelated schemas. This produces immediate supply chain and production efficiencies through the automated transfer of digital content from one electronic standard to another. It also provides for the multi-purposing of digital content, so that data is fully interoperable across all the full range of functional uses possible in the digital production and transmission of content. Three such applications for this technology are publishing, conference and learning management software products. There are many others, well outside the domain of textual content.

The invention described here allows metadata newly created through its apparatus to be interpolated into any number of metadata schemas. It also provides a method and apparatus by means of which data harvested in one metadata schema can be imported into another.

This invention is a unique method providing a highly flexible rule-based system for automatically inter-connecting XML schema, in a way that each term of a schema could be related to one or more terms of one or more other schema, with a rule-driven mechanism determining the nature of the relation.

Other possibilities of this technology are in the areas in which the semantic web has so much—as yet unfulfilled— promise. This includes: indexing, cataloguing and metadata systems; product identification systems; systems for the production, manufacture and distribution of copyright digital content; knowledge and content management systems; systems for multi-channelling content providing for disability access, for instance; machine translation from one natural language to another; and artificial intelligence.

The method and apparatus can be used for separating underlying ontology within ontology-based software or mark-up schema from its domain-specific application.

In one form there is provided a method including the step of rendering to alternative formats and media—such as to a web-browser rendering to a computer screen, a typesetting device rendering to print, hand-held reading devices, personal digital assistants and mobile phones rendering to portable screen, or as digital talking book rendering as synthesised speech—irrespective of source DTD and available stylesheets within the range of that DTD. The invention automatically manufactures tangible, expressed meanings in different formats including formats for which certain stylesheet transformations were not anticipated or possible in the source DTD in which the data was formed.

The method can include the step of forming the definition of metadata so that it is automatically generated in different formats, for different purposes; and creates different uses of the digital or physical content to which that metadata refers—for instance, as a library cataloguing record, a learning object, a digital rights management record, or an e-commerce record. This, too, is irrespective of source DTD and available stylesheets within the range of that DTD. The invention automatically manufactures tangible, expressed meanings in different formats including formats for which certain stylesheet transformations were not anticipated or possible in the source DTD in which the data was formed.

The present invention further pertains to a method and a system which allows data that has been entered into a computer to be used in multiple ways, even if these ways were not intended at the point of data entry or inherent to the data entry method. These varied uses may involve alternative forms of data rendering and multiple forms of metadata representation. It also allows interoperability of data entered in one software or mark-up schema, with other software schemas, even if the semantic range and functions of the original schema are narrower than those for which the data, using this invention, is now used. The technical fields in which this invention operates are metadata and mark-up schemas in computer software systems. The invention automates the rendering of digital content in multiple and alternative data and metadata frameworks, and recognisable by different software systems.

Also the invention pertains to searching for data across heterogeneous schemas, as long as those schemas have been mapped to the interlanguage DTD. Operators can search against the definitions supplied by the interlanguage DTD, which can be transformed using the rules described by the claims into queries against definitions supplied by any of the supported schemas.

BRIEF DESCRIPTION OF THE DRAWINGS

The invention is now described in more detail in the form of non-limiting embodiments according to the present invention, clarified with the help of the enclosed drawings, where:

FIG. 1 illustrates the crosswalks dilemma, in which 21 ontologies require 420 crosswalks.

FIG. 2 illustrates the indefinitely extensible interlanguage mechanism—in which CGML is provided as an example.

FIG. 3 illustrates the interlanguage mechanism, by means of which the number of mappings equals the number of mapped schemas.

FIG. 4 shows the method of operation of the Interlanguage apparatus.

FIG. 5 illustrates the ontology-building apparatus.

FIG. 6 illustrates one possible method of data entry within a publishing software system, the data from which can be exported into multiple ontologies using the underlying interlanguage invention.

FIGS. 7A and 7B schematically illustrate one instance of abstract interlanguage representation, along with indicative tag synonyms.

FIG. 8 shows a fragment of the Dublin Core to CGML Thesaurus.

FIG. 9 shows a fragment of the CGML Dictionary of Authorship and Publishing specifying the concepts of <Creation> and <Creator>.

DETAILED DESCRIPTION OF PREFERRED EMBODIMENTS

The method upon which this invention is based is a mechanism which we have termed an 'interlanguage' DTD, built into the functioning of a computer system. By virtue of the operation of interlanguage tags forming an intermediating ontology, a full set of and indefinitely extensible series of crosswalks with a domain can be achieved easily and effectively (see FIG. 2). The interlanguage automates the crosswalk-to-crosswalk process. If tag <x> in Ontology A translates into tag <q> in the interlanguage, and tag <y> in Ontology B also translates into tag <q> in the interlanguage, then an automated tag translation from Ontology A to Ontology B can be achieved. The practical effect of the interlanguage is to add the functionality of Ontology A to the functionality of Ontology B, even though interoperability of data and functionalities may not have been conceived by the designers of a particular source or destination ontology, nor anticipated by the users entering data within the framework of each ontology. By means of this invention, a practical mechanism is created by means of which 420 crosswalks can be replaced by twenty-one crosswalks to the interlanguage (see FIG. 3).

This invention achieves the results for which it has been designed by means of the following two mechanisms:

1. For data already residing in XML-based or other similarly formed schemas or ontologies, it automatically passes that data through a filter apparatus using the interlanguage mechanism, into other schemas and ontologies even through the data had not originally been designed for the destination schema. The filter apparatus is driven by the semantic and syntactical mechanics which is the subject of this invention, and throws up queries in cases where an automated translation of data is not possible in terms of those semantic rules.
2. For new data, the filter apparatus provides full automation of interoperability as the semantic and syntactical rules built into the software code from which the apparatus is constructed.

The apparatus is able to read tags automatically, and thus interpret the data which has been marked up by these tags, according to two overarching mechanisms, and a number of submechanisms. The two overarching mechanisms are the superordination mechanism and the composition mechanism.

The superordination mechanism automatically constructs tag-to-tag 'is a . . .' relationships. Within the superordination mechanism, there are the submechanisms of hyponymy ('includes in its class . . . '), hyperonymy ('is a class of . . . '), co-hyperonomy ('is the same as . . . '), antonymy ('is the converse of . . .') and series ('is related by gradable opposition to . . . ').

The composition mechanism automatically constructs tag-to-tag 'has a . . . ' relationships. Within the composition mechanism, there are the submechanisms of meronymy ('is a part of . . . '), co-meronymy ('is integrally related to but exclusive of . . . '), consistency ('is made of . . . '), collectivity ('consists of . . . ').

These mechanisms for data interpolation are illustrated in the lower half of FIG. 4. These mechanisms are fully automated in the case of new data formation within any schema, in which case, deprecation of some aspects of an interoperable schema may be automatically requested at the point of data entry.

In the case of legacy data generated in schemas without anticipation of, or application of, the interlanguage mechanism, data can be imported in a partially automated way. In this case, tag-by-tag or field-by-field queries are automatically generated according to the filter mechanisms of:

taxonomic distance (automatically testing whether the relationships of composition and superordination are too distant to be necessarily valid), levels of delicacy (whether an aggregated data element needs to be disaggregated and re-tagged), potential semantic incursion (identifiable sites of ambiguity), and translation of silent into active tags or vice versa (at what level in the hierarchy of composition or superordination data needs to be entered to effect superordinate transformations).

This mechanism for data interpellation is illustrated in the upper half of FIG. 4.

In one scenario, a quantum of legacy source data is provided to the apparatus, marked up according to the schematic structure of a particular source ontology. The apparatus then reads the structure and semantics ontology immanent in the data, interpreting this both from DTD and the way the DTD is realised in that particular instance. It applies four filters: a delicacy filter, a synonymy filter, a contiguity filter and a subset filter. The apparatus is able to read into the DTD and its particular instantiation an inherent taxonomic or schematic structure. Some of this is automated, as the relationships of tags is unambiguous based on the readable structure of the DTD and evidence drawn from its instantiation in a concrete piece of data. The apparatus will also be able read the points at which it is possible there might be ambiguity, and in this case throw up a structured query to the user. Each human response to a structured query becomes part of the memory of the apparatus, with implications drawn from the user response and retained for later moments when interoperability is required by this or another user.

On this basis, the apparatus interpolates the source data into the interlanguage format, whilst at the same time automatically 'growing' the interlanguage itself based on knowledge acquired in the reading of the source data and source ontology.

Having migrated into the interlanguage DTD format, the data is then reworked into the format of the destination ontology. It is rebuilt and validated according to the mechanisms of superordination (hyponymy, hyperonymy, co-hyperonomy, antonymy and series) and composition (meronymy, co-meronymy, consistency, collectivity). A part of this process is automated, according to the inherent structures readable into the destination ontology, or previous human readings that have become part of the accumulated memory of the interlanguage apparatus. Where the automation of the rebuilding process cannot be undertaken by the apparatus with assurance of validity (when a relation is not inherent to the destination DTD, nor can it be inferred from accumulated memory in which this ambiguity was queried previously), a structured query is put to the user, whose response in turn becomes a part of the memory of the apparatus, for future use.

On this basis, the data in question is interpolated into its destination format. From this point, it can be used in its destination context or DTD environment, notwithstanding the fact that the data had not been originally formatted for use in that environment.

In another scenario, new data might be constructed in a source ontology which has already become 'aware' by means of previous applications of the interlanguage mechanism as a consequence of the application of the apparatus described above. In this case, the mechanism commences with the automatic interpellation of data, as the work of reading and querying the source ontology has already been performed. In these circumstances, the source ontology in which the new data is constructed becomes a mere facade for the interlanguage, taking the form of a user interface behind which the processes of subordination and composition occur.

Key operational features of this invention are:
1. Overlay Integration: The capacity to absorb effectively and easily new ontologies which refer to domains of knowledge, information and data that substantially overlap (vertical ontology-over-ontology integration). The invention is capable of doing this without the exponential growth in the scale of the task characteristic of the existing crosswalk method.
2. Contiguity Integration: The capacity to absorb ontologies representing new domains that do not overlap with the existing range of domains and ontologies representing these domains (horizontal ontology-beside-ontology integration).
3. Vertical Integration: The capacity to extend indefinitely into finely differentiated sub-domains within the existing range of domains connected by the interlanguage, but not yet this finely differentiated (vertical ontology-within-ontology integration).

This invention is not 'software'. A software approach to the problem of interoperability would start with abstractions of a purely semantic kind, and create a quasi-literary set of tag relations which relate meanings to meanings, mapping them in tag by tag along the lines of the 'crosswalk' methodology. The software approach is essentially a manual, authorial solution to the technical challenge of interoperability. In contrast, this invention sets in motion a series of mechanical interactions within the processing functions of a computer which automatically build interoperability according to the inherent system and structure of DTDs and data files which instantiate and exemplify that DTD. The key to this invention, in other words, is mechanical machine-reading process rather than a literary-software coding process.

The basis of the embodiment of the invention known as CGML is in the semantic ground of publishing. There is an essential stability in the everyday lifeworld of authorship and publishing. The technologies may be changing, but there are still creators (writers, editors, illustrators) creating works (books in print and electronic formats, chapters, articles and other written, visual and audio texts) which are subject to copyright agreements, which are then used by consumers (readers, learners). Schemas do no more than represent that lifeworld from a particular perspective—be that the perspective of the library, digital resource discovery, rights, commerce, education or rendering/production. Schemas may come and go, but the lifeworld they purport to represent and facilitate remains relatively stable. At most, it changes incrementally.

The core concepts and principles of CGML and the inter-language DTD include that tags fit into schemas and these schemas function as paradigms. Tags mark up the narrative flow of activity sequences around the construction of meanings, and the architectures of meaning characteristic of specific social languages. Tagged narratives represent meaning functions and, in the rendering process, form follows function.

This embodiment of the invention is in the field of the now relatively stable historical tradition of the book. It provides an account of the internal information architecture of the book as well as the world of books in the plural—the systematic ordering of books in the world of libraries and bookselling. CGML has two primary forms of expression, a paradigmatic expression in the form of the Taxonomy of Authorship and Publishing (supported by a dictionary and a thesaurus) and an open framework for the construction of Authorship and Publishing Activity Narratives which link the CGML tag concepts into activity sequences focused on products (the lifecycle of a work, for instance) or roles (the activity structures of authoring, publishing or browsing for a book, for instance).

In terms of current computer science terminology CGML is an ontology. In philosophy it is stated that "ontology" is a theory about the nature of existence, of what types of things exist; ontology as a discipline studies such theories. Artificial-intelligence and web researchers have co-opted the term "ontology" to be a document or file that formally defines the relations among terms. The most typical kind of ontology for the web has a taxonomy and a set of inference rules.

Represented as a taxonomy, CGML relates its more than thousand-odd tags into eight orders of concept, or eight levels linked by branch or parent-child relationship. Referring to FIGS. 7A and 7B as is required by XML expression languages, there is a single first order concept or "root element". This root element is <Meaning>. This has two children: <Function> and <Form>. As CGML has little interest in <Form>, no children are noted, although children could be added if and when there appeared to be a need to develop a new account of the realm of presentation and stylesheet transformation. From a representational or communicative point of view, <Function> remains unexpressed without a material realisation as <Form>. <Function> has no practical existence without <Form>.

As a taxonomic third level <Function> splits into three: a <SemanticGround>, a process of <Creation>, and the means of <Distribution>. The <SemanticGround> consists at a fourth level of the activities of a <Party> (a <Person> or <Organisation> at the fifth level), in a specifiable <Location>, at or during a point of <DateAndTime> and a <Subject> indicating the material, social or metaphysical referent of the creative work, to which a reader or user's attention may be directed. The process of <Creation> consists at a fourth level of primary <Creator>, ancillary <Contributor>, whose creative efforts have an inherent <Design> (which at a fifth level becomes a <Work> and a sixth level becomes a <Product> such as, at a seventh level a <Book> or a <Map> for instance).

The third level process of <Creation> may also involve ascribing a fourth level <Status> (such as <Proposal>, <Draft> or <Edition> at fifth level) providing a <Description>, noting the form of linguistic presentation in a natural <Language> indicating <Relations> to encompassing or subsidiary <Works> or <Products> naming a <Publisher> defining <Rights> ascribing a unique <Identifier> such as a product number or Digital Object Identifier and describing <Format>. Still at a fourth level, the products of the <Creation> process have an inherent <Structure> or information architecture (covering everything from <MacroStructure> such as <Chapter> and <Index> and <LocalTextStructures> down to the level of <Paragraph> or <Emphasis> for words or phrases). These are supplemented by <Externals> which refer to the <Work> in question, such as a <Review> or <RefereeReport>.

The final third level concept of <Distribution> provides a framework for the tagging of <Audience> (who a <Work> is meant for), <Availability> (where and how it can be found), <Consumer> (who reads or uses it), <Item> (an individual manifestation of a <Product>), <Transaction> (the legal basis of a particular <Consumer> use), <Delivery> (how the <Item> reaches the <Consumer>) and <Provenance> (where the <Item> has been during its life). This is the beginning of a paradigm which currently runs to a thousand <Function>s within the field of <Meaning>, and whose main focus at this stage is the creative process of authorship and the publication of books.

Within CGML, there are two types of tags: open tags and closed tags. Open tags mark up any content which they happen to enclose. For instance: <MainTitle> Any Conceivable Title</Title>. In the XML expression format, these are called "elements". Closed tags specify a strictly defined range of content alternatives, and these take the form of a predetermined list of secondary tags. For example <MeaningMode> can only be defined amongst the alternatives <LinguisticMode>, <VisualMode>, <AudioMode>, <GestureMode>, <SpatialMode> and <Multimodal>. In the XML expression format, these are called "attributes".

Paradigm is constructed in CGML by means of a number of taxonomic construction rules. Although CGML tags are written in natural language, this belies a level of precision not found in natural language. Natural language involves considerable semantic ambiguity; whereas a tagging schemas needs to attempt to reduce this as much as practicable. It does this by rigorously applying two semantic logics that exist somewhat less rigorously in natural language: the logic of distinction-exclusion and the logic of relation-inclusion. The logic of distinction-exclusion exists with parallel branches (sibling relations) in a taxonomy. A <Person> is not an <Organisation> because an <Organisation> is defined as a legally or conventionally constituted group of <Persons>. On the other hand, the logic of relation-inclusion applies to the sub-branches that branch off superordinate branches in a taxonomy (parent-child relations). A <Party> to a creative or contractual relationship can be either a <Person> or an <Organisation>.

Domain-specific paradigms in the form of tagging schemas are designed to reduce the guesswork and contextual inference required in natural language. The solution is to build a social language which clarifies the exclusions and inclusions. This is achieved in CGML by three overlapping visual and textual techniques: taxonomy, thesaurus and dictionary.

However on the general rules of taxonomy or paradigm formation we make distinctions between taxonomic processes of superordination and composition. Superordination relations perform the function of sub-classification. They express an "is a" relationship between one level in the taxonomic hierarchy and another. <Book> is a <Product> as is an <AudioRecording>. Composition relations, by contrast connect parts into wholes. They express a "has a" relation between levels in the taxonomic hierarchy. A <GlossaryItem> and a <GlossaryItemDefinition> are both parts of a <Glossary>. Indeed a <Glossary> is not functional without both of these parts.

To the superordination and compositional principles identified, the system of the invention adds the capacities of taxonomies to make a distinction of immanence. This expresses an "underlies" relationship between contiguous levels in the taxonomic hierarchy. A <Design> underlies a <Work> and a <Work> underlies a <Product>. In CGML <Design> has just one child<Work>. However <Design> and <Work> cannot be conflated even though there are no multiple children with whom composition (part/whole) or sub-classification functions can be performed. A <Design> may encompass 5 the full scope and essential character of a <Work>. This may be prefigured at the planning or <Proposal> stage. However a <Design> may never become a <Work>. If it does however it does not disappear; rather it is applied and adapted and remains immanent within the <Work>. Similarly a <Work> such as the lyrics for a song remains immanent within its various instantiations as a <Product> such as a <Book> or an <AudioRecording> or as a <Performance> at an <Event>.

Finally taxonomies need to be cohesive if they are to provide an effective paradigmatic role for a field of practice. Such cohesion is created to a large degree by the proximity of concepts in contiguous levels in the hierarchy. Between one level and another, relations need to be tested to see whether a tag-concept on one level is experientially close enough to be presumed by a tag-concept on another. <PrintedBook> and <Design> are not experientially close concepts and thus would not form a cohesive parent-child relationship. However the <Design>, <Work>, <Product>, <Book>, <PrintedBook> hierarchy involves contiguous items sufficiently close in an experiential sense to ensure taxonomic cohesion.

Referring in particular to FIG. 7B the CGML open-element tags and the CGML fixed-attribute tags are represented at the top of each section, while the underlined concepts indicate levels of implementation.

For each tag synonyms are identified in the various tagging schemas against which CGML is mapped. The sources of tag synonyms are:

---

AGLS = Australian Government Locator Service (also incorporates DC)
BIBLINK = BIBLINK
DTB = Digital Talking Book
DB = DocBook
DC = Dublin Core
EAD = Encoded Archival Description Language
EdNA = Education Network Australia (also incorporates DC)
EML = Educational Modelling Language
iCal = Internet Calendaring and Scheduling Core Object Specification
IMS = Instructional Management
Systems/SCORM = Sharable Content Object Reference Model
IN = Indecs
JDF = Job Definition Format
MARC = Machine Readable Cataloging Record
NC = National Curriculum Metadata Standard (also incorporates DC)
ODRL = Open Digital Rights Language
OEB = Open eBook
ONIX = ONIX
RSS = Really Simple Syndication
TEI = Text Encoding Initiative
XHTML = Extensible Hypertext Markup Language (incorporating HTML4)
XrML = Extensible Rights Management Language.

---

<Person> data for instance can only be collected in the smallest granular units by any of the mapped tagging schemas. A valid CGML <Person> record (and the IMS, ONIX, XrML, Indecs, EAD and MARC synonyms) can only be generated from data recomposed from smaller granular units including, fore instance, <GivenNames> and <Surname>.

Figure 8:
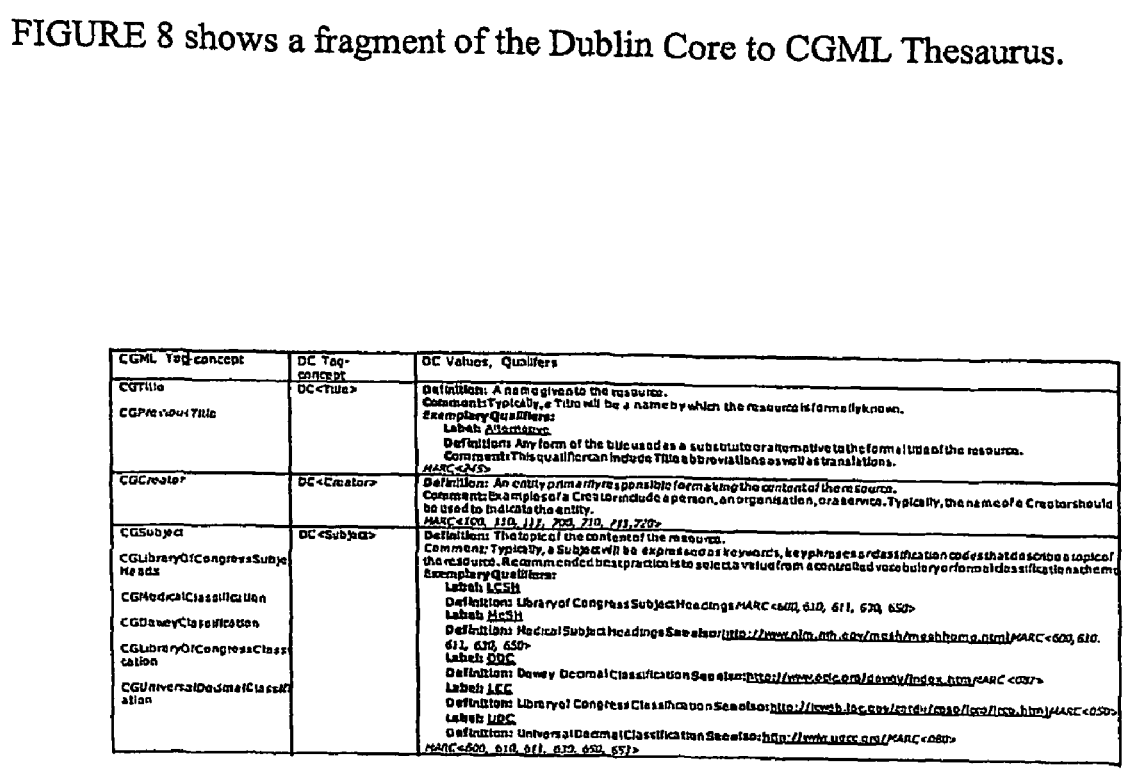

The CGML Thesaurus takes each tagging schema as its starting point, lists its tags and reproduces the definitions and examples as given by each tagging schema. In this sense CGML actually works with twenty-one thesauri and each new mapping will require an additional thesaurus. Each thesaurus captures the way in which each tagging schema defines itself, and within its own terms. Against each tag, a direct CGML synonym is provided, whose semantics are coextensive with, or narrower than, the tag against which the mapping occurs. Unlike a conventional thesaurus, only one CGML equivalent is given for each mapped tag. FIG. 8 shows a fragment of the Dublin Core to CGML Thesaurus.

The CGML Dictionary is a dictionary of a peculiar kind. It is more like a glossary than a dictionary. The CGML Dictionary is best defined by how it is different from a natural language. It does not purport to be about external referents as "meaning"; rather it is built via the interlanguage technique from other languages which purport to have external referents. Moreover insofar as the semantic ground of CGML is meaning itself it is a kind of meta-semantics, a language of meaning. It happens to centre on the realm of semantics in general—the meaning of meaning—and within that realm the social practices and technologies of representation and communication stabilised in the historical tradition of the book.

FIG. 9 shows a fragment of the CGML Dictionary of Authorship and Publishing specifying the concepts of <Creation> and <Creator>. The Dictionary links a notation (the tag-concept) which may be used in practice as a label for a field in a database or as an XML tag, to a semantically explicit definition, as well as an annotation which explains and exemplifies the tag-concept in terms of subordinate tag-concepts in the taxonomy (the various logics of relation-inclusion discussed earlier) and provides advice where necessary on appropriate and well formed data entry. The building blocks of the CGML dictionary are the other tag-concepts of the CGML schema and these are connected by hyperlinks. The definition builds on parent tag-concepts; the annotation suggests the possible instantiations of a tag-concept by means of illustrative child tag-concepts.

The Dictionary is constructed using five semantic rules: minimised ambiguity; functional clarity; lowest common denominator semantics; the distinction of silent from active tag-concepts; and comprehensive internal cross-reference.

Minimised ambiguity is the digital expression language being far removed from natural language to provide a clearer definition. For example the term <Editor> in normal parlance can include <CopyEditor> and <CommissionerEditor>. In CGML <Editor> is defined as a primary <CreatorRole> in relation to a <Work>.

Functional clarity is inherent in the creation of the CGML dictionary as it is not a description of things in themselves. Its purpose is functional—in a primary sense to provide an account of meaning functions, and in a secondary sense to provide a reliable basis for automated rendering through stylesheet transformation languages. Every definition and annotation explains in the first instance what an entity does, rather than what it is. Each tag-concept moreover can only do one thing.

Interlanguage uses synonyms. In the case of tag synonyms with roughly equivalent but not identical semantics CGML either takes the narrower definition in cases when one tag represents a subset of another; or in the case of overlap, creates a new definition restricted to the semantic intersection between the functional referents of the two equivalent tags. This guarantees that data will always be created from within CGML which can be validly exported as content into the database field or XML-tagged content spaces markup by equivalent tag synonyms within the mapped schemas. If the rule of lowest common denominator semantics is rigorously applied all data entered within the framework of this definition and data entry rules will produce valid data for each of the standards in which a synonymous term exists.

The rule of distinction of silent from active tag-concepts is required as although certain tag concepts in CGML map against others successfully using the rule of lowest common denominator semantics, they cannot in practice be implemented at this level because they do not have a sufficient level of semantic delicacy to allow interoperability with schemas that require greater semantic delicacy than is possible at that level. Data entry must be broken up into the various elements at the finest level of delicacy required by all of the mapped tag-schemas; it can then automatically be recomposed to create valid data to populate the silent-tag concepts.

Comprehensive internal cross-reference is provided in the CGML dictionary as hyperlinks. Every hyperlinked tag-concept in the dictionary definitions and annotations takes the user to a precise definition and annotation of that tag-concept. Cumulatively the dictionary definitions and annotations build a systematic account of relations of relation-inclusion and distinction-exclusion, providing descriptive content to the abstract visual representation of paradigm in the taxonomy. The result is that the schema becomes less like a selection of concepts that seem useful to a domain and more like a theory of that domain.

In combination with its thesaurus and dictionary, CGML uses the dictionary to unpack the meaning by means of paraphrase and exemplars and uses the thesaurus to display wordings through which meanings can be aptly expressed. The CGML adds another layer of rigour by mapping the twenty-one thesauri into the paradigm-constituting taxonomy. The effect is the systematic mapping of existing and emerging tagging schemas against each other and the stabilisation of synonyms between different markup languages through the medium of the interlanguage DTD or CGML. This can add functionality to existing schemas, not only by extension of new functionalities to otherwise separate schemas, but also by reinterpreting data created in one framework for unanticipated use in another.

Practically this means that CGML provides a simple transparent clearly defined natural language tagging framework which will create data conforming to the schemas against which it is mapped. CGML data can be exported into an XML schema against which CGML has been mapped. The effect is to ensure interoperability between different data collection practices and frameworks—so foe instance data collected with a CGML defined framework can simultaneously become a MARC library catalogue record and an ONIX record for a B-2-B ecommerce transaction. Data formatted in any XML namespace against which CGML has been mapped can be imported into a CML defined database, and from this it can be exported into XML namespaces other than the one for which the data was originally defined but only when that data enters CGML at the level granular delicacy required by the most delicately granular schema against which CGML has been mapped (identified by underlined tags in FIG. 7B.

From the above it can be seen that one embodiment of this invention is a publishing system by means of which creators and publishers enter metadata which is interoperable across an extensible range of metadata systems.

Another embodiment of this invention is a text editor which captures the structure and semantics of textual and other data in such a way that it is interoperable across an extensible range of rendering formats and media.

Another embodiment of this invention is an ontology building apparatus by means of which application- and use-specific semantics can be crafted which conform to the underlying semantic apparatus, and which as a consequence guarantees interoperability and automates alternative metadata retrieval and rendering options.

Another embodiment of this invention is a multilingual and multi-script translation apparatus, by means of which ontologies and software systems originally conceived and mapped in one language can be applied in a way conforming to their original semantics in a language for which they were not designed.

Another embodiment of this invention is an apparatus for structural and semantic mark-up which adds accuracy to machine translation by providing markers intelligible to the translation as a controlled vocabulary, based on their origins and recognisable ontologies.

In one of a broad range of possible instantiations, the invention tackles one of the fundamental issues of the 'semantic web'—the problem of interoperability between overlapping and related electronic standards and particularly in the area of publishing—how to relate standards in the areas of 1) typesetting and content capture, 2) electronic rendering, 3) print rendering, 4) B-2-B e-commerce, 5) digital rights management, 6) e-learning, 7) interne resource discovery and 8) cataloguing. The underlying 'interlanguage' mechanism of the Mark-up Language can be seen to extend the useability of content across multiple standards. The method ameliorates the enormous problem of interoperability in general, not just in publishing but in other areas of the semantic web.

Section 1: Core Ontology-Building Tool

This section of the instantiation of the interlanguage apparatus for the publishing industry locates CGML in a core piece of ontology building software, CGLexicographer. This piece of software defines and determines:

Database structures for storage of metadata and data.

XML document inputs.

Synonyms across the tagging schemas for each standard against which CGML maps.

Two definitional layers for every tag: underlying semantics and application-specific semantics.

Export options into an extensible range of electronic standards expressed as XML DTDs.

The essential operative feature of this section is to provide the core apparatus for managing the interlanguage mechanism that is at the heart of this invention. It manages the superordination and compositional mechanisms described earlier, as well as providing an interface for domain-specific applications in which interoperability is required (such as publishing or learning management systems).

Section 2: E-Commerce Interoperability

This section builds and tests e-commerce functionalities by means of CGML, principally ONIX, or the Online Information Exchange standard, initiated in 1999 by the Association of American Publishers, and subsequently developed in association with the British publishing and bookselling associations. The purpose of ONIX is to capture data about a work in sufficient detail to be able automatically to upload new book data to online bookstores such as Amazon.com, and to communicate comprehensive information about the nature and availability of any work of textual content. This sits within the broader context of interoperability with ebXML, an initiative of the United Nations Centre for Trade Facilitation and Electronic Business.

Key areas of technical improvement in this section include:

Creating data which exports automatically into the book production supply chain.

Creating data which works within overarching e-commerce protocols.

The essential operative feature of this section is to create a fully interoperable mechanism for managing e-commerce transactions related to digital content.

Section 3: Interoperability of Cataloguing, Indexing and Resource Discovery

This section builds and tests interoperabilities for cataloguing, indexing and resource discovery within the CGML 'interlanguage' mechanism. The MARC (Machine Readable Catalogue) format was initially developed in the 1960s by the US Library of Congress. Most recently, MARC has been translated into three XML formats: a full version; a cut-down version under the name MODS (the Metadata Object Description Schema; and a standard specifically for the identification, archiving and location of electronic content, METS: the Metadata Encoding and Transmission Standard. In similar territory, although taking somewhat different approaches to MARC, are Biblink and Encoded Archival Description Language. In the indexing and resource discovery areas, Dublin Core has gained wide international acceptance. Although there are some isolated and ad hoc standard-to-standard 'crosswalks', no generalised interoperability across these standards has been achieved, nor with other standards related to other functionalities around textual and other creative content.

Key areas of technical improvement include:

Creating a system which creates valid records on the fly across variant cataloguing, indexing and resource Discovery frameworks.

The essential operative feature of this section is to create a fully interoperable mechanism for managing the indexing and cataloguing digital content.

Section 4: Tool for the Capture of Text as Structured Data, Interoperable with Print and Electronic Rendering Standards This section builds and tests interoperabilities for capturing and rendering text within the CGML 'interlanguage' mechanism. A number of electronic standards have been created for the purpose of describing the structure of text in order to facilitate its rendering to alternative formats. Unicode is designed as a universal multilingual character encoding standards; I-ITML4 and XHTML are designed primarily for rendering transformations through web browsers; the OASIS/UNESCO sanctioned DocBook standard is for structuring text to be rendered electronically or to print; the Text Encoding Initiative has been designed for literary works, natural language dictionaries and corpus linguistics; Open e-Book is for rendering to hand-held reading devices; and Digital Talking Book is for rendering to audio as synthesised speech. Although there are some specific interoperabilities built into particular standards, there is as yet no generalised interoperability across rendering standards.

Key areas of technical improvement include:

Metadata automatically generated from the structural and semantic mark-up of captured data.

Multi-channelling of content into formats defined by variant standards: to print, to screen, to audio.

The essential functional feature of this section is to create a fully interoperable mechanism for managing the structural and semantic mark-up of digital content.

Section 5: Automated Workflow into Digital and Offset Print Manufacture.

This section builds and tests interoperabilities for print manufacture within the CGML 'interlanguage' mechanism. The Job Definition Format is rapidly becoming the universal standard for the printing industry, as a digital addendum to offset print, and as the driver of digital print. Interoperability of JDF with other standards mean, for instance, that a book order triggered through an online bookstore (the ONIX space) generate a JDF wrapper around a content file as an automated instruction to print and dispatch a single copy.

Key areas of technical improvement include developing automated cross standards and cross supply chain manufacturing mechanism. The essential operative feature of this section is to create a fully interoperable mechanism for managing printing of digital content.

Section 6: e-Learning Interoperability Mechanism

This section builds and tests interoperabilities for e-learning environments within the CGML 'interlanguage' mechanism. Cutting across a number of areas—particularly rendering and resource discovery—are tagging schemas designed specifically for educational purposes. EdNA and the UK National Curriculum Metadata Standard are both variants of Dublin Core. Rapidly rising to broader international acceptance, however, is the Instructional Management Systems Standard and the related Shareable Content Object Reference Model. Not only do these standards specify metadata to assist in resource discovery. They also build and record conversations around interactive learning, manage automated assessment tasks, track learner progress and maintain administrative systems for teachers and learners. The genesis of IMS was in the area of metadata and resource discovery, and not the structure of learning texts. One of the pioneers in the area of structuring and rendering learning content (building textual information architectures specific to learning and rendering these through stylesheet transformations for web browsers) was Educational Modelling Language. EML has since been grafted into the IMS suite of schemas and renamed the IMS Learning Design Specification. The e-learning components of CGML we have named Learning Design Language—which crosses all e-learning standards.

With this application of the invention, technical improvement achieved is achieved particularly in the areas of:

Achieving functional interoperability across e-learning standards;

Integrating e-learning standards with broader resource discovery, rendering, e-commerce, digital rights and other standards.

The essential operative feature of this section is to create a fully interoperable mechanism for integrating digital content into learning management systems.

Section 7: Achieving Digital Rights Interoperability

This section builds and test interoperabilities for digital rights management within the CGML 'interlanguage' mechanism. Digital Rights Management involves the identification of copyright owners and legal purchasers of creative content; it can also involve systems of encryption by means of which content is only accessible to legitimate purchasers; and systems by means of which content can be decomposed into fragments and recomposed by readers to suit their specific needs. The <indecs>, or Interoperability of Data in E-Commerce Systems framework was first published in 2000, the result of a two year project by the European Union to develop a framework for the electronic exchange of intellectual property (<indecs> 2000). The conceptual basis of <indecs> has more recently been applied in the development of the Rights Data Dictionary for the Moving Pictures Expert Group's MPEG-21 framework for distribution of electronic content. From these developments and discussions, a comprehensive framework is now emerging, capable of providing mark-up tools for all manner of electronic content. Amongst the other tagging schemas marking up digital rights, Open Digital Rights Language is an Australian initiative which has gained wide international acceptance and acknowledgement. And XrML, or Extensible Rights Mark-up Language was created in Xerox's PARC laboratories in Paulo Alto. Its particular strengths are in the areas of licensing and authentication.

Technical improvements based on the invention include:
Attaining interoperability across DRM standards.
Linking DRM standards across supply-chain wide functionalities.

The essential operative feature of this section is to create a fully interoperable mechanism for the proprietary and copyright aspects of digital content.

Section 8: Further Systems

This section involves further systems which work by application in the three inter-related software applications which the invention has been developing: CGPublisher, CGLearner and CGConference.

The essential operative feature of this section is to create a fully interoperable application which realises the potentials of the interlanguage apparatus in several specific areas of digital content management.

At the level of data, the interlanguage is a digital manufacturing mechanism and apparatus. It is an invention which adds flexibility to the process of making a visible and represented meaning on a computer screen, a piece of paper or an audible sound. The manufacturing steps are as follows:

1. Data entry directly into an interlanguage interface, or into Ontology A, or and import of extant data created in Ontology A into the interlanguage;
2. Automated translation into interlanguage;
3. Translation from interlanguage into Ontology B;
4. Ontology B stylesheet creates a particular form of physical manifestation of communicated meaning for which Ontology B was designed, but not necessarily for which Ontology A was created.

At the level of metadata, the interlanguage is also a manufacturing mechanism, automatically allowing this metadata to be represented in a range of different ways by means of a data export apparatus as follows:

1. Metadata entry into an interlanguage interface, or into Ontology A, or and import of extant data created in Ontology A into the interlanguage;
2. Automated translation into interlanguage;
3. Export of data into Ontology B cataloguing, resource discovery or metadata database;
4. Rendering of metadata in formats characteristic of Ontology B, such as library cataloguing records or 'advanced' search mechanisms which are able to differentiate semantically different kinds of search.

One specific application of this invention is Common Ground Markup Language, an ontology of authorship and publishing which, by means of the interlanguage invention and the CGLexicographer apparatus, interoperates across twenty-one major ontologies.

In the most challenging of cases—in which the raw digital material is created in a legacy DTD or ontology, and in which that DTD is not already known to the interlanguage from previous interactions—the invention:

i. interprets structure and semantics from the source DTD and its instantiation in the case of the particular quantum of source data, using the filter mechanisms described above—for example, in the case of publishing and the Common Ground Markup Language interlanguage, a hypothetical newly introduced digital rights management framework;
ii. draws inferences in relation to the digital rights DTD and the particular quantum of data, applying these automatically and presenting structured queries in cases where the apparatus and its filter mechanism 'knows' that supplementary human interpretation is required;
iii. stores any automated or human-supplied interpretations for future use, thus building knowledge and functional useability of this new DTD into the interlanguage—in this example, into Common Ground Markup Language. These inferences then become visible to subsequent users, and capable of amendment by users, through the CGLexicographer interface;
iv. interpellates the data into the interlanguage format, in this example Common Ground Markup Language;
v. creates a cross-walk from Common Ground Markup Language into a designated destination DTD, for instance a new format for structuring text for rendering to a flexible substrate, using the superordination and composition mechanisms—these are automated in cases where the structure and semantics of the destination DTD are self-evident to the apparatus, or they are the subject of structured queries where they are not, or they are drawn from the CGLexicographer memory in instances where the same query has been answered by an earlier user;
vi. Interpolates data into the destination format;
vii. Supplies data for destination uses—in this instance, digital rights data applied to a new rendering format.

To give a less challenging example, the source DTD can be already known to the interlanguage, by virtue of automated validations based not only on the inherent structure of the DTD, but also many validations against a range of data instantiations of that DTD, and also numerous user clarifications of queries. In this case, the source DTD might be the e-learning standard associated with the UK National Curriculum, and the destination DTD might be Educational Modelling Language.

In this case:

i. By entering data in an interface which 'knowingly' relates to an e-learning interlanguage, Learning Design Language, which has been created using the mechanisms of this invention, there is no need for the filter mechanisms nor the interpolation processes that are necessary in the case of legacy data and unknown source DTDs; rather data is entered directly into the interlanguage format, albeit through the user interface 'facade' of the source DTD—in this case, the UK National Curriculum Standard;
ii. the apparatus then interpolates the data onto the designated destination format, in this case, from the interlanguage of Learning Design Language, into Educational Modelling Language;
iii. The data can be used in the destination format, Educational Modelling Language.
iv. It is possible to use the interlanguage apparatus to construct and apply other meta-mark-up languages which tie together other semantically overlapping of contiguous ontologies. In each case, the invention construct in the interlanguage in part in automated ways, and in part by remembering and interpreting for later reapplication moments when a human response was required to a structured query. In this way the apparatus constructs an interlanguage appropriate to the particular range of required interoperabilities across a specified range of ontologies.

Another specific application of this invention is Learning Design Language, an ontology of curriculum documentation and pedagogy which, by means of the interlanguage invention and the CGLexicographer apparatus, interoperates across major e-learning and digital curriculum publishing ontologies.

It should be understood that the above description describes various embodiments of the invention. Clearly other variations which are understandable by a person skilled in the art without any inventiveness are included within the scope of the invention as defined in the following claims.

The invention claimed is:

1. A method of translating a first schema of data having one structure or semantics into a second schema of data having a second structure or semantics, the method comprising:
 using an ontology deconstruction and reconstruction transfer mechanism which creates an interlanguage document type definition (DTD) in which the interlanguage DTD manages the structure and semantics of the structure and semantics of data to allow an interlanguage definition of the first schema and translation into the second schema by the transfer mechanism;
 wherein use of the deconstruction and reconstruction transfer mechanism includes:
 machine-reading tags;
 interpreting the data format which has been marked up by these tags and detecting its inherent structures or semantics to be included in the interlanguage DTD; and
 using the interlanguage DTD to transfer the data of the first schema into the second schema;
 wherein the transfer mechanism includes a superordination mechanism and a composition mechanism; and
 wherein within the superordination mechanism there are the submechanisms of hyponymy, hyperonymy, co-hyperonomy, antonymy and series.

2. The method according to claim 1, wherein within the composition mechanism, there are any one or more of the submechanisms of meronymy, co-meronymy, consistency and collectivity.

3. The method according to claim 1, wherein data is imported, and in which supplementary tag-by-tag or field-by-field relationships are generated using one or more of the filter mechanisms of:
 taxonomic distance for determining whether the relationships of composition and superordination are too distant to be necessarily valid,
 levels of delicacy for determining whether an aggregated data element needs to be disaggregated and re-tagged,
 potential semantic incursion for determining identifiable sites of ambiguity, and
 translation of silent into active tags or vice versa for determining the level in the hierarchy of composition or superordination at which data needs to be entered to effect superordinate transformations.

4. The method according to claim 3, wherein a thesaurus and dictionary is are created in combination with a taxonomy definition in which the dictionary unpacks the meaning by means of paraphrase and exemplars and the thesaurus display wordings through which meanings can be aptly expressed.

5. The method according to claim 4, further comprising mapping a layer of the thesaurus into a paradigm-constituting taxonomy for each schema in a related technology to thereby provide a basis of transfer of data to any other mapped schema in the related technology.

6. The method according to claim 5, wherein the thesaurus takes each schema as its starting point, lists its tags and reproduces the definitions and examples as given by each schema and against each tag, a direct synonym is provided, whose semantics are coextensive with, or narrower than, the tag against which the mapping occurs to provide a single equivalent for each mapped tag.

7. The method according to claim 4 in which the dictionary is constructed using five semantic rules:
 minimized ambiguity;
 functional clarity;
 lowest common denominator semantics; distinction of silent from active tag-concepts; and
 comprehensive internal cross-reference.

8. A method of interpellating source data into an interlanguage DTD format for use in transferring data marked up in a first schema of data having one structure or semantics into a second schema of data having a second structure or semantics, the method comprising:
 providing a quantum of source data of said first schema to a processing and storing apparatus;
 machine-reading the said source data into a DTD according to a schematic structure of a particular source ontology;
 automatically reading the structure and semantics ontology immanent in the source data by interpreting this both from the DTD and the way the DTD is realised in that particular instance;
 applying a plurality of filters including a delicacy filter, a synonymy filter, a contiguity filter and a subset filter;
 determining from the DTD and its particular instantiation an inherent taxonomic or schematic structure forming the interlanguage DTD comprising of relationships of tags that are unambiguous based on the readable structure of the DTD and evidence drawn from its instantiation in the source data.

9. The method according to claim 8, further comprising:
 providing a structured query for assessment of ambiguous relationships of tags and receiving an assessed response to the structured query to add to the interlanguage DTD.

10. The method according to claim 9, further comprising:
 drawing implications from the assessed response to the structured query to become part of the memory of the apparatus, for aiding in automatically reading the structure and semantics ontology immanent in the source data.

11. The method according to claim 10, further comprising:
 using the determined interlanguage DTD to build a destination dataset using the mechanisms of superordination including hyponymy, hyperonymy, co-hyperonomy, antonymy and series, and composition including meronymy, co-meronymy, consistency and collectivity.

12. The method according to claim 8, wherein part of the process of building a destination data is automated according to the inherent structures readable into the destination ontology or from any previous received assessments of ambiguous structures.

13. A method for translating a first schema of data having one structure or semantics into a second schema of data having a second structure or semantics using a computer-implemented ontology deconstruction and reconstruction transfer mechanism which automatically creates an interlanguage document type definition (DTD) in which the interlanguage DTD automatically manages the structure and semantics of the structure and semantics of data to allow an automatic interlanguage definition of the first schema and translation into the second schema by the transfer mechanism, the method comprising:
- automatically machine-reading tags;
- interpreting data format which has been marked up by the tags and detecting its inherent structures or semantics;
- automatically constructing an interlanguage DTD from the interpreted data format and detected structures or semantics; and
- automatically transferring the data of first schema into the second schema via automatic definition of the first schema into the second schema using the interlanguage DTD;
- wherein the transfer mechanism includes overarching superordination and composition mechanisms; and
- wherein within the composition mechanism there are included submechanisms of meronymy, co-meronymy, consistency, and collectivity.

14. The method according to claim 13, wherein within the superordination mechanism, there are any one or more of the submechanisms of hyponymy, hyperonymy, co-hyperonomy, antonymy and series.

15. The method according to claim 13, wherein supplementary tag-by-tag or field-by-field queries are automatically generated according to any one or more of the filter mechanisms of:
- taxonomic distance for automatically machine-reading whether the relationships of composition and superordination are too distant to be necessarily valid,
- levels of delicacy for machine-reading whether an aggregated data element needs to be disaggregated and re-tagged,
- potential semantic incursion for machine-reading identifiable sites of ambiguity, and
- translation of silent into active tags or vice versa for machine-reading the level in the hierarchy of composition or superordination at which data needs to be entered to effect superordinate transformations.

16. A data management method comprising:
- translating a first schema of data having one structure or semantics into a second schema of data having a second structure or semantics by using a computer-implemented ontology deconstruction and reconstruction transfer mechanism which automatically creates an interlanguage document type definition (DTD) in which the interlanguage DTD automatically manages the structure and semantics of the structure and semantics of data to allow an automatic interlanguage definition of the first schema and translation into the second schema by the transfer mechanism; and
- utilizing a thesaurus and dictionary provided in combination with taxonomy definition in which the dictionary unpacks the meaning by means of paraphrase and exemplars and the thesaurus display wordings through which meanings can be aptly expressed;
- wherein the dictionary is constructed using five semantic rules:
- minimized ambiguity;
- functional clarity;
- lowest common denominator semantics;
- a distinction of silent from active tag-concepts; and
- comprehensive internal cross-reference.

17. The method according to claim 16 further comprising:
- mapping the thesaurus into the paradigm-constituting taxonomy for each schema in a related technology to thereby provide a basis of transfer of data to any other mapped schema in the related technology.

18. The method according to claim 17, wherein for each schema of data the thesaurus lists its tags and includes definitions and examples from each schema of data, and a direct synonym is mapped against each tag, whose semantics are coextensive with, or narrower than, the tag against which the mapping occurs to provide a single equivalent for each mapped tag.

19. A method for extending the range of useability of ontology driven systems and for creating interoperability between different mark-up schemas for the creation, location and formatting of digital content, the method comprising:
- having a database or datafile of digital content in a Document Type Definition of the first digital mark-up or computer software ontology able to be outputted in a selected format allowed by the first digital mark-up or computer software ontology;
- organizing digital mark-up or computer software tags of the first digital mark-up or computer software ontology into an overarching interlanguage ontology capable of absorbing and incorporating at least one other digital mark-up or computer software ontology;
- automatically translating a Document Type Definition of the first digital mark-up or computer software ontology into a translated interlanguage Document Type Definition;
- selecting the at least one other digital mark-up or computer software ontology;
- automatically translating the translated interlanguage Document Type Definition into a Document Type Definition of the selected other digital mark-up or computer software ontology thereby allowing information in the database or datafile format to be output in the required selected format allowed by the selected other digital mark-up or computer software ontology;
- wherein organizing digital mark-up or computer software tags of the first digital mark-up or computer software ontology into an overarching interlanguage ontology capable of absorbing and incorporating at least one other digital mark-up or computer software ontology includes applying the filter mechanisms of:
- taxonomic distance for determining whether the relationships of composition and superordination are too distant to be necessarily valid,
- levels of delicacy for determining whether an aggregated data element needs to be disaggregated and re-tagged,
- potential semantic incursion for determining identifiable sites of ambiguity, and
- translation of silent into active tags or vice versa for determining the level in the hierarchy of composition or superordination at which data needs to be entered to effect superordinate transformations.

20. The method according to claim 19, wherein organizing digital mark up or computer software tags of the first digital mark-up or computer software ontology into an overarching interlanguage ontology capable of absorbing and incorporating the selected other digital mark-up or computer software ontology further includes indexing according to the following rules:
- providing a first level of granularity such that tags which represent data at a finer level of delicacy in the first ontology produce automatically recomposed data in the selected other ontology which manages the same data at a higher level of semantic aggregation;
- providing a lowest common denominator semantics such that, when data has been data marked up with a pair of tags that can be interpreted to be closely synonymous but not identical, the narrower semantics of the two tags is operationalized;

providing contiguous domains wherein tags can be aggregated and aligned by virtue of the fact that they relate to semantically exclusive data; and providing subset schemas within a tag such that a whole new domain identified within the first ontology or within a defined area thereof can be mapped within a single tag in the selected other ontology.

21. The method according to claim 20, further comprising returning a set of results from data based on heterogeneous schemas that have been mapped against the interlanguage Document Type Definition.

* * * * *